United States Patent
Ogasawara et al.

(10) Patent No.: US 7,251,560 B2
(45) Date of Patent: Jul. 31, 2007

(54) ROUTE-SETTING DEVICE, MAP DISPLAY DEVICE AND NAVIGATION SYSTEM

(75) Inventors: Akihiro Ogasawara, Toyokawa (JP); Toru Hiroyama, Auckland (NZ)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 11/085,229

(22) Filed: Mar. 22, 2005

(65) Prior Publication Data

US 2005/0251327 A1   Nov. 10, 2005

(30) Foreign Application Priority Data

Mar. 23, 2004   (JP)   ............. 2004-084830

(51) Int. Cl.
*G01C 21/34*   (2006.01)
*G08G 1/0969*   (2006.01)

(52) U.S. Cl. .................. 701/201; 701/211; 340/995.19

(58) Field of Classification Search ...................... None
See application file for complete search history.

(56) References Cited

U.S. PATENT DOCUMENTS 6,295,503 B1 *   9/2001   Inoue et al. ................ 701/209
6,609,090 B1 *   8/2003   Hickman et al. ............... 704/9
2004/0024523 A1 *   2/2004   Uotani ........................ 701/210

FOREIGN PATENT DOCUMENTS

| EP | 0 811 960 | 12/1997 |
| EP | 1288615 A1 * | 3/2003 |
| JP | A-9-222332 | 8/1997 |
| JP | A-9-318377 | 12/1997 |
| JP | A-11-83519 | 3/1999 |
| JP | A-2001-195690 | 7/2001 |
| JP | A-2001-227974 | 8/2001 |
| JP | A-2001-235344 | 8/2001 |
| JP | A-2003-323652 | 11/2003 |
| JP | A-2005-17169 | 1/2005 |
| JP | A-2005-114552 | 4/2005 |

* cited by examiner

*Primary Examiner*—Michael J. Zanelli
(74) *Attorney, Agent, or Firm*—Posz Law Group, PLC (57) ABSTRACT

A route is set by reading map data of an area used for calculating the route. When this area includes a road pricing area, it is determined if there exists a road pricing area into where the user is permitted to enter based on the permission data (road pricing area to where the entrance is permitted and the permission period) read out from an IC card inserted in an ERP car-mounted unit and stored in a storage unit. When there exists a road pricing area to where the entrance is permitted, the road pricing area is excluded from the areas to be avoided, and the route is calculated.

14 Claims, 5 Drawing Sheets

ROUTE-SETTING DEVICE, MAP DISPLAY DEVICE AND NAVIGATION SYSTEM

CROSS REFERENCE TO RELATED APPLICATION

This application is based on and incorporates herein by reference Japanese Patent Application No. 2004-84830 filed on Mar. 23, 2004.

FIELD OF THE INVENTION

The present invention relates to a device for setting and displaying an optimum route, and, more particularly, to such a device that takes road pricing into consideration when displaying the route.

BACKGROUND OF THE INVENTION

There has been known a navigation system which can be utilized as a guide by detecting the present position accompanying the traveling of a vehicle relying upon the GPS or the like, displaying the present position on a display unit together with a road map, and setting a suitable route from the present position to a destination, contributing to a smooth driving. The route is usually set by utilizing the Dijkstra method or the like method. Concretely speaking, route calculation costs (evaluated values for the route) from the present position to the nodes are calculated by using the map data stored in a static source of data such as a CD-ROM or DVD-ROM and by using the link data for the links among the nodes. Links that make the total cost a minimum are connected at a step where the calculation of the total cost up to the destination has finished to set the route to the destination.

Further, when the route is calculated based on only the data of the static source of data, it is not allowed to add dynamic varying traffic conditions to the conditions of calculation. Therefore, the route to the destination may include a road having congested traffic due to, for example, construction or a traffic accident that has not been recorded as static data. Therefore, there have been conceived systems for receiving traffic regulation data from a dynamic source of data or for receiving a recommended route by adding traffic regulation data thereto, such as ATIS or VICS employed in Japan and RDS-TMC employed in European countries. In a navigation device receiving the data specifying a portion where the traffic is congested, for example, the route cost of the congested portion is increased to be greater than what it usually is. This permits limited inclusion of the congested portion in the route, thereby making it possible to automatically set a detour avoiding the congested portion caused by the construction or traffic accident as mentioned above. The same also holds even when the detour itself is received from the dynamic source of data.

However, even if the traffic is not congested, the user may often wish to avoid a particular traveling area due to individual circumstances. According to the above method based on the static source of data or the dynamic source of data, the particular traveling area cannot be avoided to meet the user's knowledge or individual circumstances. Therefore, a technology has been disclosed enabling the user to set an avoided area based on the user's determination and to set a route to avoid the above area (see, for example, a patent document 1).

The avoided area may be a regulated area in the road pricing system for relaxing the congested portion or for improving the air pollution (hereinafter referred to as road pricing area) (see non-patent document 1). Entry into the road pricing area requires permission (entrance permission: area license), and such permission must be obtained in advance, such as, for example, a determining period of one day, one week, one month or one year. There will be no problem to travel through the load pricing area if the area license is valid. If the area license is not valid, however, a fine will be imposed if the user travels through the load pricing area.

Therefore, even the road pricing area may be set as the avoided area when the area license is not valid to automatically set a detour avoiding the road pricing area.

[Patent document 1] JP-A-11-83519

[Non-patent document 1] Description related to the road pricing in the home page of Tokyo Metropolitan Environment Bureau [online], updated: Nov. 13, 2004 [retrieved on Mar. 11, 2004], When the road pricing area is to be set as an avoided area according to the conventional method, however, the user must determine whether the area license is valid/invalid at the time of setting the route based on the valid term of the area license, and must set the road pricing area as the avoided area when the area license is invalid. Therefore, the road pricing area must be set to be the avoided area every time the area license is obtained or every time the area license becomes invalid (every time the valid term expires), and must reset it, requiring very cumbersome operations. If the user forgets to do the above actions, the user may travel through the road pricing area despite the area license being invalid and be possibly fined.

The above problem is not limited to the above road pricing areas but may similarly occur in regulated areas where entrance is limited based on permission.

SUMMARY OF THE INVENTION

In view of the above problem, it is an object to provide a technology capable of setting a suitable route or displaying a map by taking into consideration the regulated areas to where one is allowed to enter only when permitted.

A route-setting device according to a first aspect comprises route-setting means for setting a route from a starting point to a destination based on map data; external data input means for receiving, from an external unit, permission data including at least a term representing a permission for entering into a particular regulated area; and determining means for determining if it is permitted to enter into the particular regulated area based on the permission data input through the external data input means; wherein the route-setting means sets a route avoiding the regulated area that is determined by the determining means not to be entered.

Without the need of setting the regulated area (e.g., road pricing area) as the avoided area by making sure the term in which the user is permitted to enter into the regulated area (e.g., valid term of area license in the case of a road pricing system) that is done by the conventional method, therefore, the route-setting device determines if it is permitted to enter therein, and automatically sets a route avoiding the regulated area if it is not permitted to enter therein, offering great convenience for the user. According to the conventional method, a user determines if it is permitted to enter. The user often forgets to set the road pricing area as the avoided area despite the area license having been invalidated due, for example, to misunderstanding, and travels through the road pricing area and is fined. By using the route-setting device of the first aspect, on the other hand, the user does not have to determine if it is permitted to enter and it does not happen that he is fined due to the mistake.

When there is only one regulated area, the regulated area can be specified by the term of permission only. When there are a plurality of regulated areas, however, they must be distinguished from each other. Therefore, according to a second aspect of the route-setting device, the permission data includes the permission term and subject area-specifying data for specifying the regulated area to where the permission term is applied. The determining means determines, based on the corresponding permission terms, if it is permitted to enter into the regulated areas specified by the subject area-specifying data in the permission data.

According to a third aspect, the area-specifying data in the permission data may be data for geographically correctly specifying the subject area, i.e., may be in the form of polygonal data used as map data resulting, however, in relatively large amounts of data. Therefore, the map data are rendered to include the data for correctly specifying the regulated areas and the identification data for identifying the regulated area. The identification data may be employed as the data for specifying the subject areas included in the permission data. In the case of the map data, polygonal data are frequently used for geographically specifying predetermined areas such as administrative sections. Therefore, the regulated areas can be specified by the same method. The identification data corresponding to the regulated areas may be, for example, a representative point included in the regulated area or the data representing the area. Further, it may be an existing code corresponding to the area, such as a zip code and a MAP CODE®. If serial numbers have been imparted to the regulated areas, then, they may be used.

The permission data is preferably input from an external unit by external data input means. However, the permission data may also be input by, for example, user operation of a operation switch group. If the road pricing system is taken into consideration, however, collection of fees becomes a prerequisite. Therefore, an IC card may be issued. Therefore, according to a fourth aspect, if the permission data has been stored in a portable medium such as the IC card, the external data input means may read and receive the permission data from the portable medium. If the portable medium is an IC card, then, a card reader may be provided.

Further, according to a fifth aspect, when a system is built up to store and manage the permission data in, for example, a data center, the permission data may be received from the data center through communication means. Therefore, the external data input means may receive the permission data from the data center.

A map display device for solving the above problems according to a first aspect comprises display control means for displaying a map on display means based on map data; external data input means for receiving, from an external unit, permission data including at least a term in which it is permitted to enter into a particular regulated area; and determining means for determining if it is allowed to enter into the particular regulated area based on the permission data input through the external data input means; wherein the display control means displays the regulated area determined by the determining means not to be entered distinctly from other areas.

Therefore, without the need of determining if the regulated area is one to where user is not permitted to enter by making sure the term (valid term of the area license in the case of, for example, the road pricing system) in which he is permitted to enter the regulated area, the user is allowed to easily determine that entry into the regulated area is not permitted owing to the display of the regulated areas on the map in a manner being distinguished from other areas. This prevents such an occurrence that the user enters into the road pricing area without knowing it and is fined.

The second through fifth aspects of the route-setting device can similarly be applied even to the map display device to exhibit the same effect.

The above route-setting device and the map display device exhibit meaningful effect even in a state where they have not been mounted on a vehicle, but become particularly effective when they are used as part of the navigation system mounted on the vehicle. For example, they can be constituted as a navigation system comprising the route-setting device described above, and guide means for guiding the traveling along the route set by the route-setting means, or can be constituted as a navigation system comprising a map display device described above, present position-specifying means for specifying the present position, and alarm control means which, when the present position specified by the present position-specifying means has approached within a predetermined distance from the regulated area displayed on the display means being distinguished from other areas, produces an alarm through alarm means to inform that the present position has approached at least within a predetermined distance.

When the route-setting means and the determining means in the above route-setting device are to be realized by a computer, when the display control means and the determining means in the map display device are to be realized by a computer, or when the display control means, the determining means and the alarm control means of are to be realized by a computer, there may be provided programs that are to be executed by the computer. Such programs are recorded in a recording medium that can be read by the computer, such as flexible disk, magneto-optic disk, DVD-ROM, CD-ROM, hard disk, ROM, RAM, etc., and can, as required, be executed being loaded on the computer or can be executed being loaded through a network so as to realize the function as control means.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Embodiment to which the invention is applied will now be described with reference to the drawings. Here, it should be noted that the invention is in no way limited to the following embodiments only but can be modified in a variety of ways so far as it does not depart from the technical scope of the invention.

Description of the Navigation System

Figure 1:
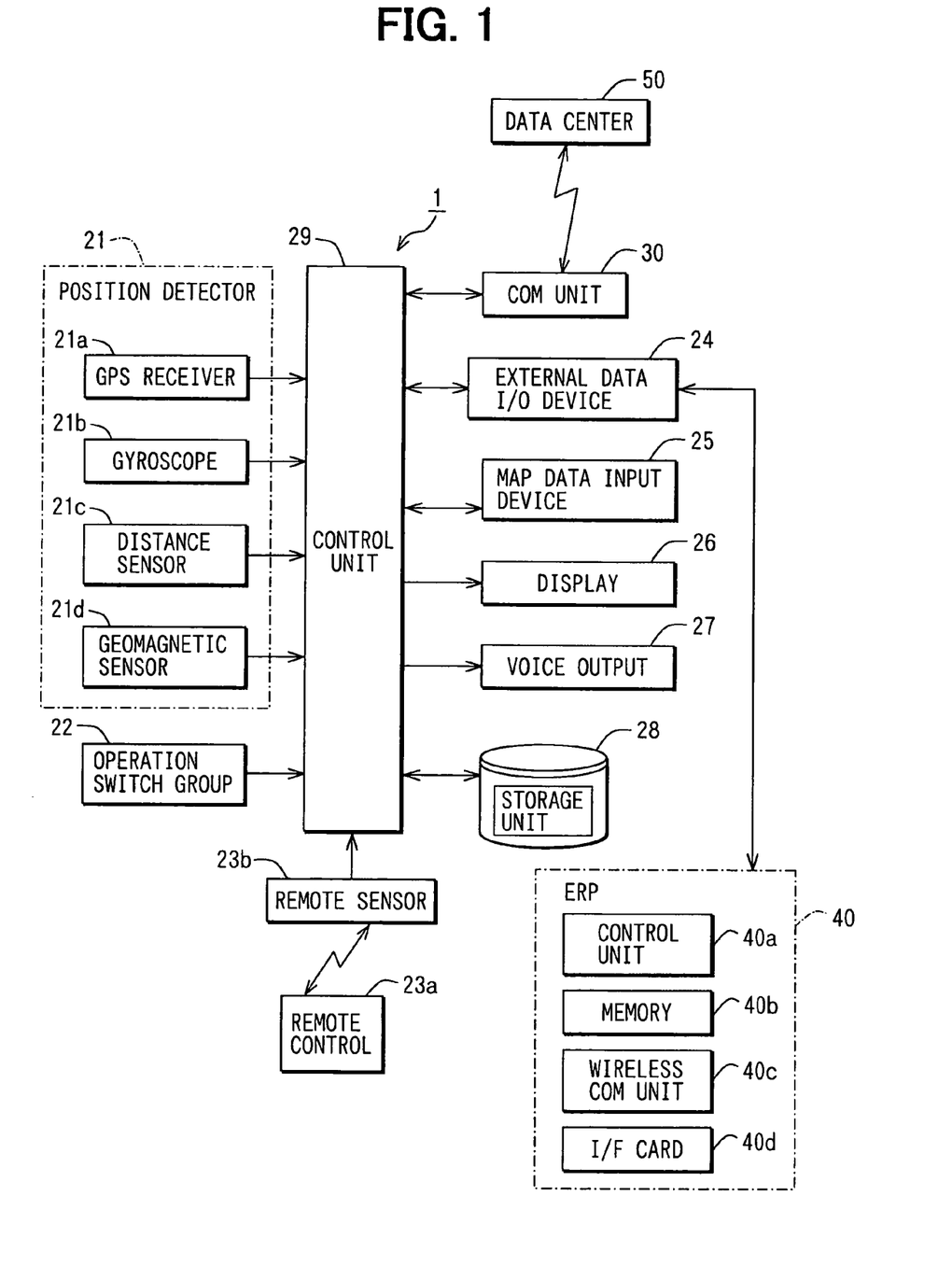
FIG. 1 is a block diagram of a navigation system according to a preferred embodiment.

FIG. 1 is a block diagram schematically illustrating the constitution of a navigation system 1 according to an embodiment.

The navigation system 1 of this embodiment is mounted on a vehicle and includes, as shown in FIG. 1, a position detector 21 for detecting the present position of the vehicle, an operation switch group 22 for inputting various instructions of the user, a remote control terminal 23a capable of inputting various instructions like those of the operation switch group 22, a remote control sensor 23b for inputting signals from the remote control terminal 23a, an external data input/output device 24, a map data input device 25 for inputting map data from an external recording medium recording map data and various data, a display unit (generally display) 26 for displaying a map display screen or a TV screen, a voice output unit 27 for outputting various guide voices, a storage unit 28 for storing various data, a communication unit 30, and a control unit 29 which executes various processing depending upon the inputs from the above position detector 21, operation switch group 22, remote control terminal 23a, external data input/output device 24, map data input device 25 and storage unit 28, and controls the position detector 21, operation switch group 22, remote control sensor 23b, external data input/output device 24, map data input device 25, display 26, voice output unit 27, storage unit 28 and communication unit 30. The storage unit 28 may be, for example, a hard disk or a flash memory.

The position detector 21 includes a GPS receiver 21a which receives electromagnetic waves transmitted from a GPS satellite through a GPS antenna to detect the position of the vehicle, a gyroscope 21b for detecting the size of the rotary motion imparted to the vehicle, a distance sensor 21c for detecting the distance which the vehicle has traveled, and a geomagnetic sensor 21d for detecting the azimuth of travel from the terrestrial magnetism. These sensors 21a to 21d include errors of different natures and are used to compensate each other. Depending upon precision requirement, only some of the above sensors may be used, or a rotation sensor of the steering and the wheel sensors of the wheels may be used.

The operation switch group 22 may consist of mechanical key switches constituted integrally with the display 26 and provided surrounding the touch panel and the display 26 on the display screen. The touch panel and the display 26 are laminated integrally together. The touch panel may be of any one of the pressure sensitive type, electromagnetic induction type, electrostatic capacity type or a combination thereof, and any one of them may be used.

The external data input/output device 24 is for inputting/outputting various external data, and exchanges the data with, for example, an electronic road pricing (ERP) car-mounted unit 40 or any other car-mounted device.

The ERP will be described here. The ERP is to realize the road pricing for relaxing traffic congestion and for improving air pollution by electronically exchanging data. In this embodiment, an on-the-road unit (not shown) is installed on a road leading to the road pricing area, and data is exchanged between the on-the-road unit and the ERP car-mounted unit 40 to determine if the vehicle mounting the ERP car-mounted unit 40 is permitted to enter the road pricing area or is prohibited from entering therein. Various measures can be taken for the vehicle that is prohibited from entering. For instance, a toll gate used in the known ETC system may be employed on a toll road so as not to open the gate. Also, a picture may be taken of a number plate by using a camera while permitting the physical entrance and a fine may be imposed at a later date based on the photographed image. In either case, in this embodiment, the personal data employed in the ETC system and the vehicle data are exchanged between the on-the-road unit and the ERP car-mounted unit 40 to determine if the user is permitted to enter into the road pricing area and to realize the imposition of fine or the like in case the user has entered therein.

The ERP car-mounted unit 40 used for the above system includes a control unit 40a, a storage unit (memory) 40b, a wireless communication unit 40c and an interface (I/F) card 40d. Among them, the wireless communication unit 40c is constituted by a communication circuit and an antenna, and is used for the radio communication for effecting the processing for automatically collecting the toll executed relative to the on-the-road unit.

The I/F card 40d is for reading and writing data from, and into, the IC card inserted in a card slot that is not shown. The IC card stores data related to the road pricing area and the permission period, data for settling the toll inclusive of personal data and application for settling the toll, and the detailed data of use received through the wireless communication unit 40c. The road pricing of this embodiment determines entrance permission for every road pricing area in order to limit traffic congestion. That is, in the case of a toll road, everybody is basically permitted to travel through. In the case of the road pricing, however, entrance of vehicles without limitation causes traffic congestion. Therefore, in order to relax the congestion, a limitation is imposed on the total number of vehicles. Therefore, particular vehicles only are permitted to enter into the particular road pricing areas. Here, the entrance is permitted not permanently but for only a predetermined permission term. Concretely, it can be considered to determine the permission term in a unit of one year, one month, one week or one day. When there are a plurality of road pricing areas, the road pricing areas must be specified. Therefore, the IC card stores the "road pricing areas into where the entrance is permitted" and "permission term" determined in advance through a contract between the user and the business body managing the ERP.

The "road pricing areas into where the entrance is permitted" represents the subject area-specifying data. Here, the embodiment uses the data that represent a representative point or a predetermined area included in the road pricing area. For example, it can be considered to use an exiting code corresponding to the area, such as a zip code or MAP CODE (registered trademark). If serial numbers are imparted to the regulated areas, then, they may be used. It is, of course, allowable to use the data for geographically correctly specifying the subject road pricing area, such as polygonal data used in the map data resulting, however, in relatively increased data amounts. In this embodiment, therefore, the map data are rendered to include the data for correctly specifying the road pricing areas and the identification data for identifying the road pricing areas.

The storage unit 40b stores the data related to the vehicle mounting the ERP car-mounted unit 40. As for the data related to the vehicle, it is considered that a shop for setting up the car-mounted unit, such as a car dealer or a car parts shop writes the data like for the ETC car-mounted unit in the ETC system.

The control unit 40a is constituted in the same manner as the known arithmetic unit, executes an arithmetic processing based on the data that is transmitted and received or on the data read out from the storage unit 40b, and executes the processing for initially setting the ERP car-mounted unit 40 (processing for writing the data for settling the toll and the setup data) and the processing related to the toll.

On the other hand, the map data input device 25 is a device for inputting various data inclusive of map data such as road data which are network data, data for geographically specifying the road pricing areas, data for so-called map matching for improving the precision for specifying the position, as well as mark data representing the facilities, and video and voice data for guiding. The data for specifying the roadpricing areas are polygonal data. This, for example, is that polygonal data are frequently used for geographically specifying the predetermined areas such as administrative sections and, hence, the road pricing areas, too, are specified by the similar method. The medium for recording the data may be any one of various kinds, such as DVD-ROM, hard disk, flash memory or memory card.

The display unit 26 may be any one of a color display unit, a liquid crystal display, a plasma display or a CRT. On the display screen of the display unit 26, there can be displayed a mark representing the present position specified from the present position of the vehicle detected by the position detector 21 and the map data input from the map data input device 25, and additional data such as a route guided to a destination, names, signs, and marks representing the facilities. There can be further displayed a guide to the facilities. The voice output unit 27 outputs the guides to the facilities input from the map data input device 25, voice for guidance, as well as voice for reading the data obtained through the external data input/output device 24.

The communication unit 30 is for receiving the data offered from the data center 50 and for transmitting the data to an external unit. The data received from the external unit through the communication unit 30 is processed through the control unit 29. The communication unit 30 may be a mobile communication equipment such as an automobile phone or a cell phone, or may be a dedicated receiver. The data offered from the data center 50 is data for VICS.

The control unit 29 is constituted chiefly by a known microcomputer comprising a CPU, a ROM, a RAM, an I/O and a bus line for connecting the constitution, and executes a variety of controls based on programs stored in the ROM. For example, it calculates the present position of the vehicle as a set of coordinates and the traveling direction based on the detection signals from the position detector 21, executes a map display processing for displaying, on the display unit 26, a map near the present position that is read via the map data input device 25, or a map of a range indicated by operating the operation switch group 22 or by operating the remote control terminal 23*a*, and executes a route guide processing for guiding the route by selecting a facility that serves as a goal by operating the operation switch group 22 or the remote control terminal 23*a* based on the point data stored in the map data input device 25 and by calculating a route to automatically find an optimum route from the present position to the goal. The method of automatically setting the optimum route may be a widely known Dijkstra method or the like method.

In executing the processing related to displaying a map, calculating a route and displaying a guide, the control unit 29 executes a processing by taking the ERP into consideration. Concretely, it receives the data representing the "road pricing areas into where the entrance is permitted" and the "permission term" stored in the IC card inserted in the ERP car-mounted unit 40 through the external data input/output device 24, and executes processing for setting a route avoiding the road pricing area to where the entrance is not permitted and for displaying a map distinguishing the road pricing area. This processing will now be described with reference to FIGS. 2 to 5.

In the foregoing was schematically described the constitution of the navigation system 1. Described below is a correspondence between the portions of the navigation system 1 and the terms described in claims. The control circuit represents the route-setting means, display control means, determining means and guide means, and the external data input/output device 24 represents the external data input means. Further, the display unit 26 represents the display means, and the position detector 21 and the control unit 29 represents the present position-specifying means.

Figure 2:
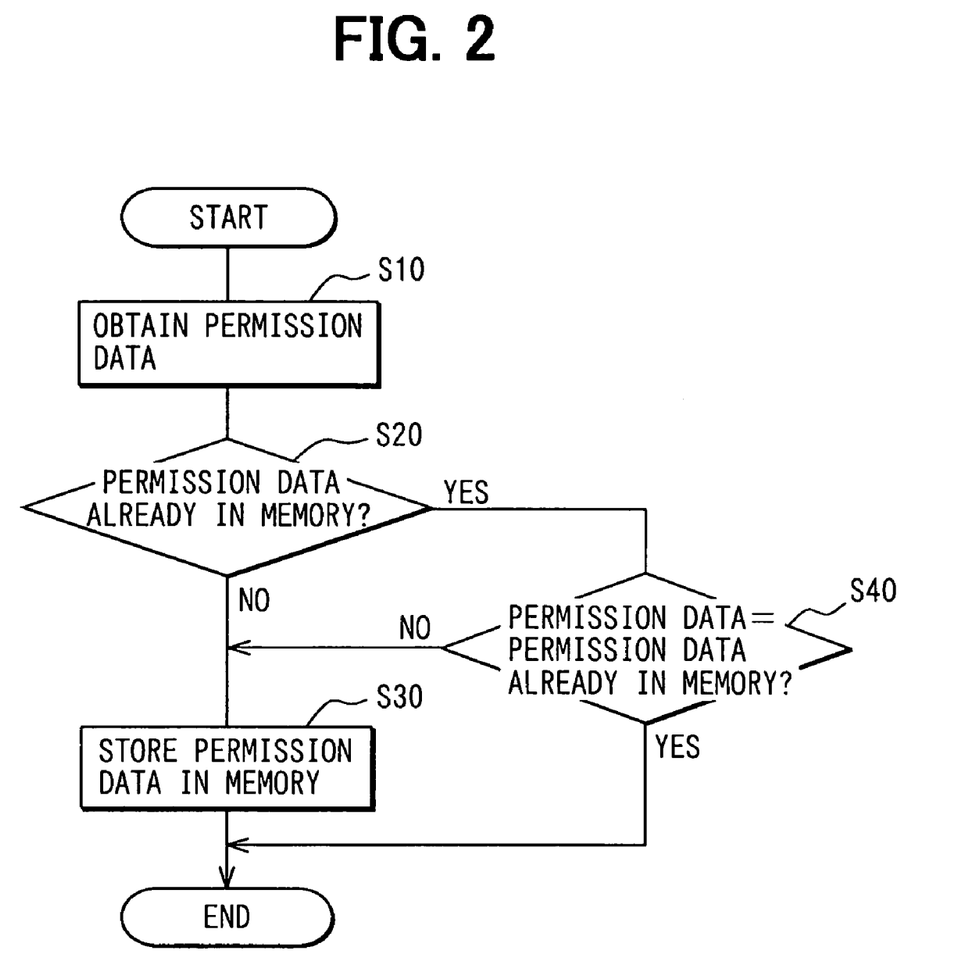
FIG. 2 is a flowchart illustrating a processing for registering the permission data.

Description of a Processing for Registering Permission Data as the Initialization Processing FIG. 2 is a flowchart illustrating a processing for registering the permission data executed by the control unit 29 in the processing for initializing the navigation system 1.

First, the data (hereinafter also called permission data) representing the "road pricing areas into where the entrance is permitted" and the "permission period" stored in the IC card inserted in the ERP car-mounted unit 40 are input via the external data input/output device 24 (S10). It is confirmed whether the permission data has already been stored in the storage unit 28 (S20). When no permission data is stored in the storage unit 28 (S20: N), the routine proceeds to S30 where the permission data obtained in S10 are registered in the storage unit 28.

On the other hand, when it is confirmed that permission data has already been stored (S20: Y), the permission data obtained at S10 is compared with the permission data stored in the storage unit 28, and it is determined whether the two are the same (S40). When the two are not the same (S40: N), the routine proceeds to S30 where the permission data obtained at S10 is updated and registered into the storage unit 28. Namely, since the old permission data had previously been stored, the data is updated to the permission data stored in the IC card that is now inserted in the ERP car-mounted unit 40. When the two are the same (S40: Y), on the other hand, there is no need of updating the data, and the processing ends.

Upon executing the registration processing, the storage unit 28 stores the data same as the permission data stored in the IC card inserted at the present moment in the ERP car-mounted unit 40.

Description of the Processing for Calculating the Route

Figure 3:
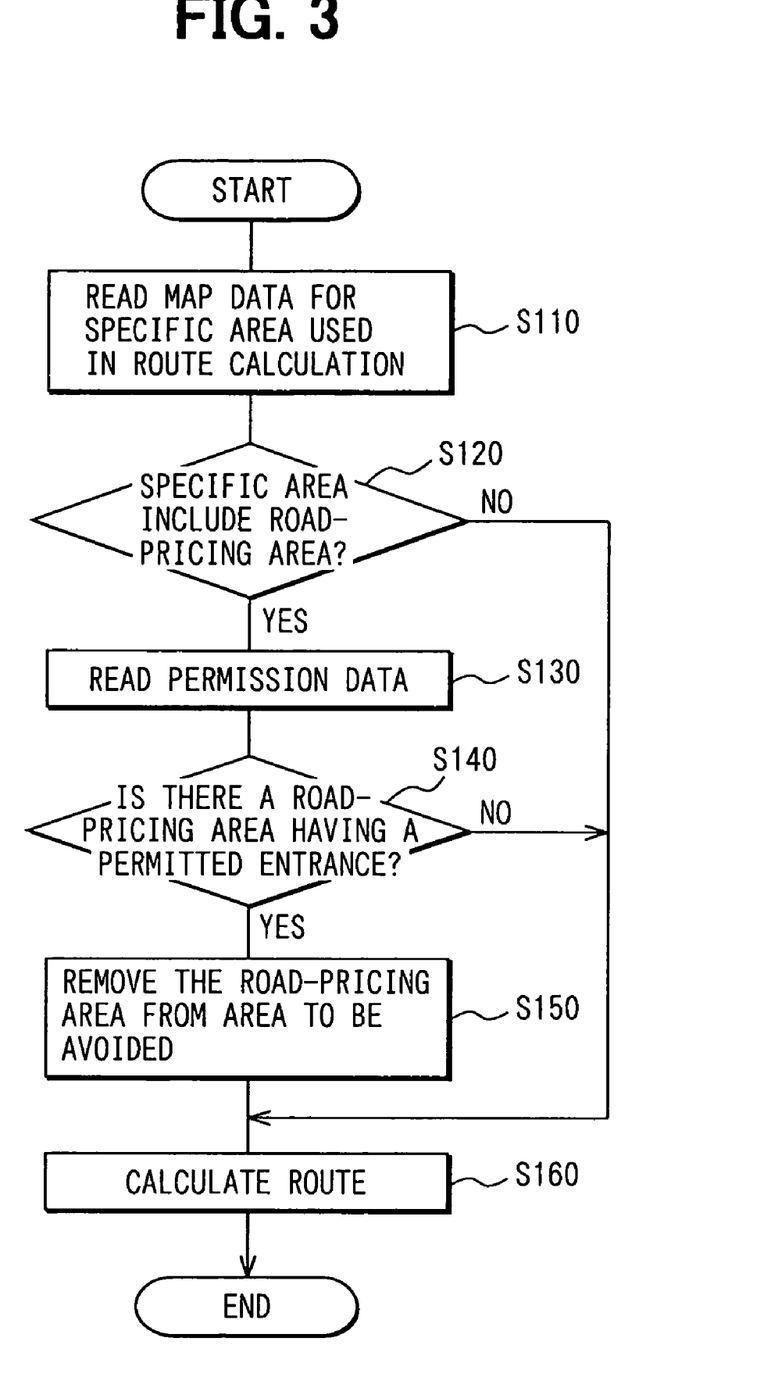
FIG. 3 is a flowchart illustrating a processing for calculating a route.

As described above, the control unit 29 executes the processing for calculating the route by utilizing the map data read out through the map data input device 25. The flow of the processing for calculating the route will now be described with reference to a flowchart of FIG. 3. FIG. 3 illustrates a procedure of processing when the data related to the present position and the destination (passing place and the like if necessary) have been obtained already, and the route is calculated based thereupon.

First, the map data of the area used for the calculation of the route (specific area) is read into the RAM in the control unit 29 from the recording medium through the map data input device 25 (S110). It is determined (S120) if there is a road pricing area belong to the area of map data used for the calculation of the route (specific area) read at S110. The determination is rendered based on the data for geographically specifying the road pricing area that exists in the map data.

When the area of the map data used for the calculation of the route (specific data) includes a road pricing area (S120: Y), the permission data is read out from the storage unit 28 (S130) and it is determined, based on the permission data read out, if there exists a road pricing area into where the entrance is permitted (S140). Concretely, it is that there is a road pricing area into where the entrance is permitted when the permission data belong to the area of map data used for the calculation of the route includes data indicating that "the road pricing area into where the entrance is permitted" and when the present day is included in the "permission term". In this embodiment, the permission term is calculated in a unit of "day" and, hence, determination is based upon "whether the present day is included in the permission term". Therefore, a problem may occur if the user travels along the route that is set just before the date changes and if the present day is the last day of the permission term. Namely, a user who is going to enter into the road pricing area may find that the date has changed and the permission term has elapsed. By taking the above into consideration, therefore, a display should be made when the route is set on the last day of the permission term, or it should be so regarded that the permission term has elapsed when the route is set just before the last day that is going to change.

When there is a road pricing area into where the entrance is permitted (S140: Y), the road pricing area is excluded from the areas that are to be avoided (S150). The avoided areas will be described below. As described in the column of background art in patent document 1: JP-A-11-83519, the avoided areas are determined for the purpose of setting a route that avoids these areas. To concretely calculate the route by taking the avoided areas into consideration, for example, the route cost for the links included in the areas or for the links including the points are increased to be larger than what it usually is in calculating the cost based on the Dijkstra method, such that inclusion of the links is limited in the route that is to be set again.

Concerning the links belonging to the road pricing areas in the map data, a weighted route cost specified by belonging to the road pricing area has been set already in addition to the route cost determined by an ordinary rule. At S150, therefore, the weighted route cost is excluded, and the processing is executed by employing an ordinary route cost only.

In calculating the route at S160, therefore, the route cost does not increase despite the road pricing area, and the route is calculated based on a prerequisite that the route cost is the one that is determined according to a rule same as the one for other links. Therefore, there is no need of setting a route detouring from the road pricing area, and the route may pass through the road pricing area if it establishes an optimum route.

When there is no road pricing area into where the entrance is permitted (S140: N), the route is calculated without executing any particular processing (S160) unlike at S150. Therefore, the weighted route cost that had been set already is reflected, and a route is set that detours from the road pricing area.

Description of the Processing for Displaying Map Data

As described above, the control unit 29 executes the processing for displaying a map by utilizing the map data read out through the map data input device 25. The flow of the processing for displaying the map will now be described with reference to a flowchart of FIG. 4.

Figure 4:
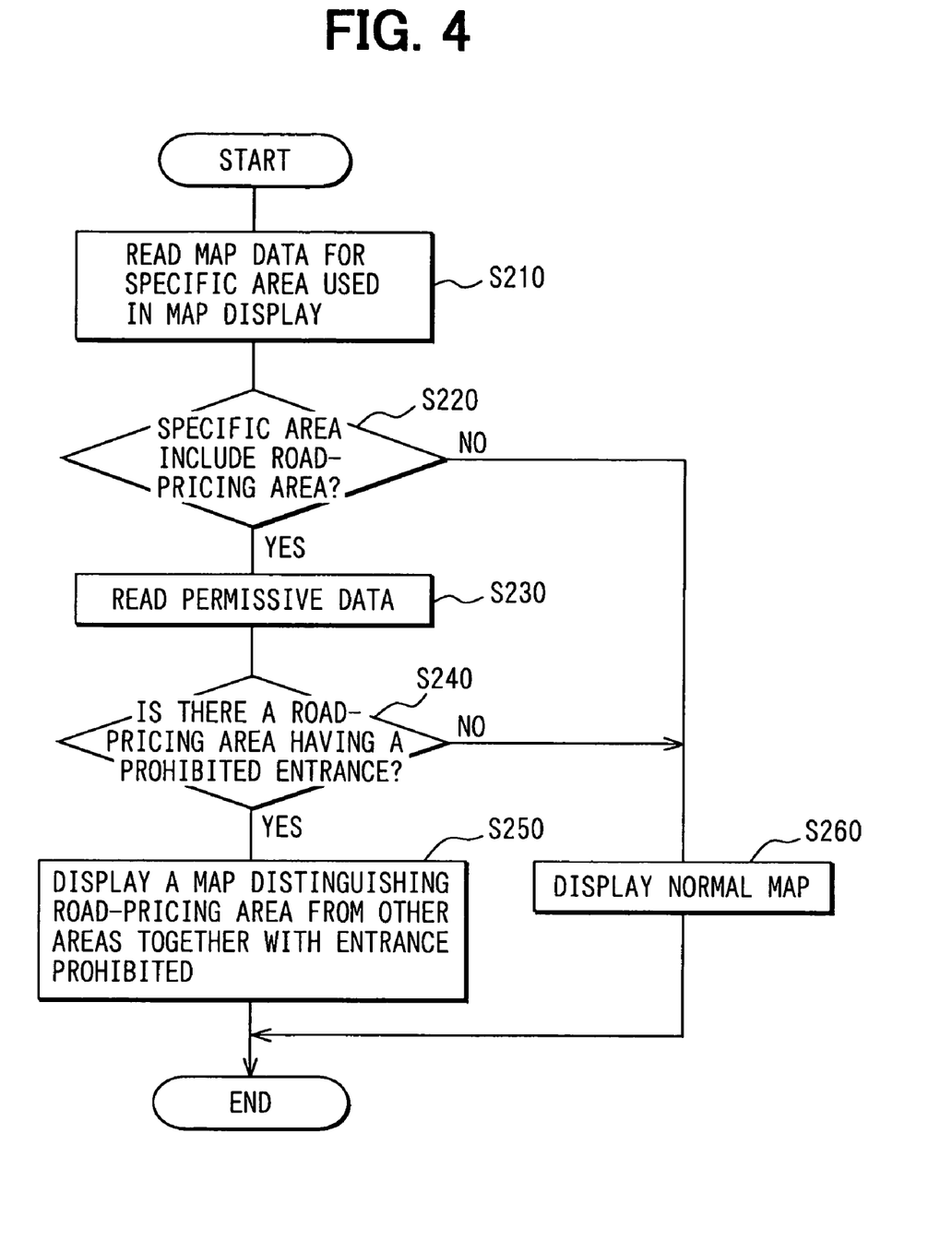
FIG. 4 is a flowchart illustrating a processing for displaying a map.

First, the map data of the area used for displaying the map (specific area) is read into the RAM in the control unit 29 from the recording medium through the map data input device 25 (S210). It is determined (S220) if there is a road pricing area belonging to the area of "map data used for the display of the map (specific area)" read at S210. When it is determined that the map data used for map display (specific area) includes a road pricing area, (S220: Y) the permission data is read out from the storage unit 28 (S230), and the determination is rendered based on the permission data read out if there exists the road pricing area into where the entrance is prohibited (S240). At S140 in FIG. 3, it was determined if there existed the "road pricing area to where the entrance is permitted". At S240, on the other hand, it is determined if there exists the "road pricing area to where the entrance is prohibited." The determining method, however, is the same as the case of S140 in FIG. 3. Concretely, if the road pricing areas belonging to the areas of map data used for displaying the map include the one which is not the "road pricing area into where the entrance is permitted" in the permission data, then, it is the "road pricing area into where the entrance is prohibited". Even the "road pricing area" into where the entrance is permitted becomes the "road pricing area into where the entrance is prohibited" if the present day is not included in the "permission term".

Figure 5:
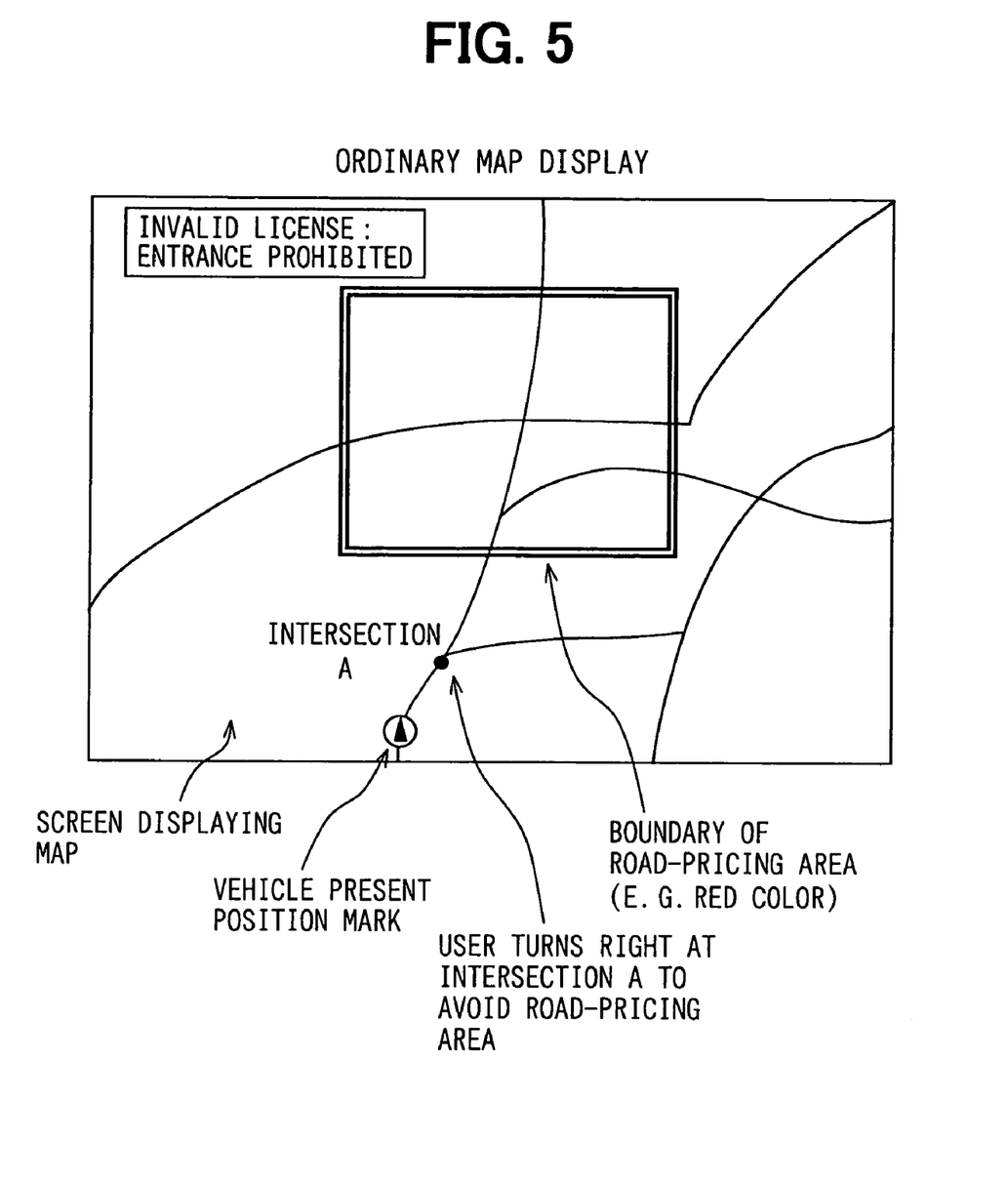
FIG. 5 is a diagram illustrating a map display.

When there is "the road pricing area to where the entrance is prohibited" (S240: Y), a map is displayed on the display unit 26 in a manner of distinguishing the above road pricing area from other areas, and a display is made stating that the entrance to the road pricing area is prohibited (S250). A concrete example is shown in FIG. 5. In FIG. 5, a mark indicates the position of the vehicle (vehicle present position mark) near the center of a lower part of the map display screen, and a road pricing area exists ahead of the present vehicle travel route. In the case of FIG. 5, a boundary line representing the road pricing area is, for example, a thick red line. Here, the color of the boundary line may be changed, or the color of the entire road pricing area may be changed. The display mode may be configured so that the brightness is changed or that the line thickness of line type is changed in addition to changing the color. Further, the road pricing area as a whole may be displayed in a highlighted manner. Generally, the road pricing area may be displayed in a manner so that it appears distinctly over other portions. On the upper left side of the map display screen of FIG. 5, further, characters are displayed reading "INVALID LICENSE: ENTRANCE PROHIBITED" to evoke caution. The display of characters is helpful for the drivers who are not familiar with the presence of the road pricing areas.

Based on a map display shown in FIG. 5, the driver determines that a right turn should be made at intersection A in front of the road pricing area to detour the road pricing area.

When there is no "road pricing area to where the entrance is prohibited" (S240: N), on the other hand, a map is displayed in an ordinary manner on the display unit 26 (S260) without executing any particular processing for the road pricing area unlike at S250.

Effect of the Embodiment

According to the navigation system 1 of this embodiment, the route can be set and the map can be displayed executing a suitable processing to inform the user if entry into the road pricing areas is permissible without the need of carrying out any particular operation.

For example, a route can be set detouring from the road pricing areas to where the entrance is prohibited and a map can be displayed in a manner that the user can easily distinguish the road pricing areas having a prohibited entrance, evoking caution so that the user will not enter into these areas. When the user confirms the term in which entry into the road pricing area is allowed according to the customary method and finds that it is not in the permission period, this embodiment determines on the side of the navigation system 1 whether entry is permitted without the need of setting the road pricing areas as the areas to be avoided, and automatically sets a route detouring the road pricing areas entry is not permitted. Therefore, this embodiment is very convenient for the user. According to the conventional method, the user was required to determine if entry is permitted. In this method, the user frequently had no permission data due to misunderstanding or forgetting to set the road pricing area as the avoided area though it is not in the permission period, causing such problems that the user has traveled through the road pricing area and is fined. According to this embodiment, on the other hand, the user does not have to determine entry is permitted and is free from such problems of being fined as discussed above.

OTHER EMBODIMENTS (a) In the above embodiment, the control unit 29 receives, through the external data input/output device 24, the permission data stored in the IC card inserted in the ERP car-mounted unit 40, and stores them in the storage unit 28. However, the permission data may be obtained, for example, from the data center 50 and may be stored in the storage unit 28. In this case, the system is such that the permission data for every user is stored and managed at the data center 50 and, in the initialization processing, the permission data is received from the data center 50 via the communication unit 30 at S10 in the processing for registering the permission data shown in FIG. 2. When thus constituted, the communication unit 30 represents the communication means.

Further, the user may input the permission data through the operation switch group 22 or the remote control terminal 23*a*. In this case, the input permission data is stored in the storage unit 28, and it is determined based thereupon if the user is permitted to enter into the road pricing area. This eliminates the need of inputting the permission data for each use. When the permission data is updated, however, the user must immediately input the permission data so as to be reflected. Therefore, reliability is maintained when the permission data is read out from the IC card or obtained from the data center 50 as in the above embodiments.

(b) In displaying a map in the above embodiment, a boundary line is displayed for representing the road pricing area as shown in FIG. 5, and characters are displayed stating that the user is not permitted to enter the road pricing area. With these displays only, however, the user may enter into the road pricing area without noticing it. When the present position has approached within a predetermined distance from the road pricing area, therefore, the fact of having approached within the predetermined distance may be effectively informed by the control unit 29 through the display unit 26 and the voice output device 27. In particular, if an alarm is produced by voice, the user may notice the display which he had overlooked. When constituted as described above, the display unit 26 and the voice output unit 27 represent the alarm means, and the control unit 29 represents the alarm control means.

(c) In the above embodiment, the control unit 29 specifies the present position of the vehicle while interpolating an error in the present position of the vehicle based on the data detected by the position detector 21 which comprises the GPS receiver 21*a*, gyroscope 21*b*, distance sensor 21*c*, etc. As described above, therefore, the position detector 21 and the control unit 29 represent the "present position-specifying means". However, the position detector 21 is not necessarily needed for establishing the present position-specifying means. For example, the position data may be obtained from a road-side beacon or the like, and the present position may be specified based thereon. Or, the present position may be specified by a function capable of specifying the position, such as a cell phone or a PHS.

The present invention is not limited to the above description and the embodiments shown in the drawings, and may be modified or expanded as described below.

The invention claimed is:

1. A route-setting device comprising:
  route-setting means for setting a route from a starting point to a destination based on map data;
  data input means for receiving permission data including at least a time-dependent permission term in which it is permitted to enter into a regulated area in which certain vehicles are prohibited from entering; and
  determining means for determining if it is permitted to enter into the regulated area based on the permission data input through said data input means;
  wherein said route-setting means sets a route avoiding the regulated area that is determined by said determining means not to be entered.

2. A route-setting device according to claim 1, said permission data includes said permission term and subject area-specifying data for specifying the regulated area among a plurality of said regulated areas to where the permission term is applied; and
  said determining means determines, based on said corresponding permission terms, if it is permitted to enter into the regulated area specified by said subject area-specifying data in said permission data.

3. A route-setting device according to claim 2, wherein said map data further includes identification data for identifying said regulated area, and the subject area-specifying data included in said permission data is said identification data.

4. A navigation system mounted on a vehicle comprising:
  a route-setting device of claim 1; and
  guide means for providing guidance during travel along the route set by the route-setting means.

5. A route-setting device according to claim 1, wherein said time-dependent permission term is configured by a unit of one year, one month, one week, or one day.

6. A route-setting device comprising:
  route-setting means for setting a route from a starting point to a destination based on map data;
  data input means for receiving permission data including at least a permission term in which it is permitted to enter into a regulated area;
  determining means for determining if it is permitted to enter into the regulated area based on the permission data input through said data input means; and
  said route-setting means sets a route avoiding the regulated area that is determined by said determining means not to be entered;
  wherein said data input means is so constituted as to read and receive said permission data from a portable medium storing said permission data.

7. A route-setting device comprising:
  route-setting means for setting a route from a starting point to a destination based on map data;
  data input means for receiving permission data including at least a permission term in which it is permitted to enter into a regulated area;
  determining means for determining if it is permitted to enter into the regulated area based on the permission data input through said data input means; and said route-setting means sets a route avoiding the regulated area that is determined by said determining means not to be entered;

further comprising communication means for exchanging data communication, via a radio circuit, with a data center storing the permission data, and said data input means is so constituted as to receive said permission data from said data center.

8. A map display device comprising:

display control means for displaying a map on display means based on map data;

data input means for receiving permission data including at least a time-dependent term in which it is permitted to enter into a regulated area in which certain vehicles are prohibited from entering; and determining means for determining if it is permitted to enter into the regulated area based on the permission data input through said external data input means;

wherein said display control means displays the regulated area determined by said determining means not to be entered distinctly from other areas.

9. A navigation system mounted on a vehicle comprising:

a map display device of claim 8;

present position-specifying means for specifying the present position; and alarm control means which, when the present position specified by said present position-specifying means has approached within a predetermined distance from said regulated area displayed on said display means being distinguished from other areas, controls an alarm means to produce an alarm to inform that the present position has approached at least within the predetermined distance.

10. A map display device according to claim 8, wherein said time-dependent permission term is configured by a unit of one year, one month, one week, or one day.

11. A map display device comprising:

display control means for displaying a map on display means based on map data;

data input means for receiving permission data including at least a term in which it is permitted to enter into a regulated area;

determining means for determining if it is permitted to enter into the regulated area based on the permission data input through said external data input means; and said display control means displays the regulated area determined by said determining means not to be entered distinctly from other areas;

wherein said permission data includes said permission term and subject area-specifying data for specifying the regulated area from among a plurality of said regulated areas to where the permission term is applied; and said determining means determines, based on said corresponding permission terms, if it is permitted to enter into the regulated areas specified by said subject area-specifying data in said permission data.

12. A map display device according to claim 11, wherein said map data includes identification data for identifying said regulated area, and the subject area-specifying data included in said permission data is said identification data.

13. A map display device comprising:

display control means for displaying a map on display means based on map data;

data input means for receiving permission data including at least a term in which it is permitted to enter into a regulated area;

determining means for determining if it is permitted to enter into the regulated area based on the permission data input through said external data input means; and said display control means displays the regulated area determined by said determining means not to be entered distinctly from other areas;

wherein said data input means reads and receives said permission data from a portable medium storing said permission data.

14. A map display device comprising:

display control means for displaying a map on display means based on map data;

data input means for receiving permission data including at least a term in which it is permitted to enter into a regulated area;

determining means for determining if it is permitted to enter into the regulated area based on the permission data input through said external data input means; and said display control means displays the regulated area determined by said determining means not to be entered distinctly from other areas;

further comprising communication means for exchanging data communication, via a radio circuit, with a data center storing the permission data, and said data input means is so constituted as to receive said permission data from said data center.

* * * * *